Figure 1:
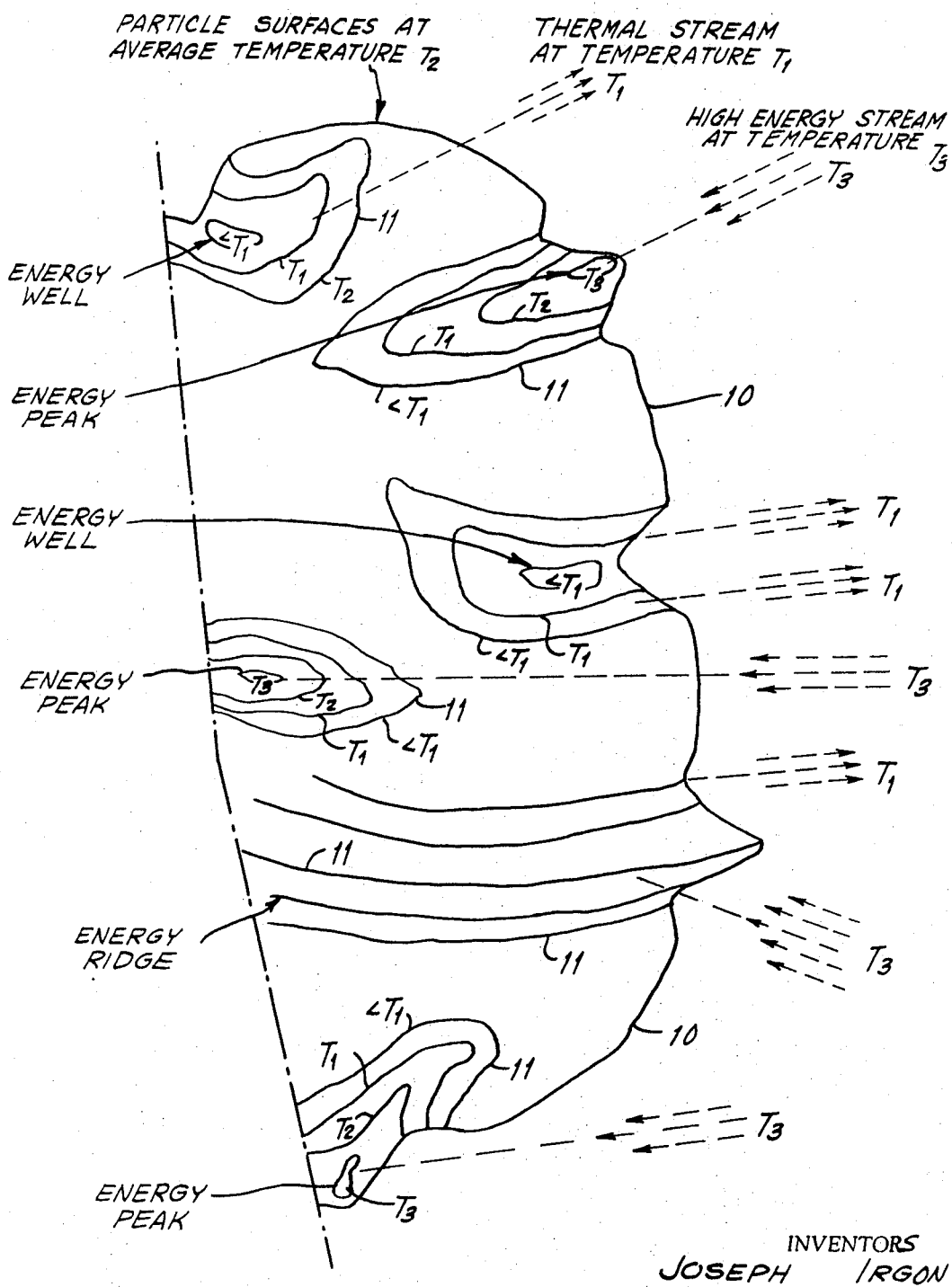

[11] 3,545,547

[72] Inventors Joseph Irgon Flanders; Howard W. Cole, Jr., Mountain Lakes, New Jersey
[21] Appl. No. 753,933
[22] Filed Aug. 20, 1968
[45] Patented Dec. 8, 1970
[73] Assignee Proteus, Inc. Mountain Lakes, New Jersey a corporation of New Jersey

[54] FIRE AND/OR EXPLOSION SUPPRESSION
11 Claims, 4 Drawing Figs.
[52] U.S. Cl. .................................................. 169/1, 169/2
[51] Int. Cl. ....................................................... A62c 1/08
[50] Field of Search .......................................... 169/1, 2

[56] References Cited
UNITED STATES PATENTS
3,421,587  1/1969  Heavilon et al. ............... 169/2

OTHER REFERENCES
The Latrobe Bulletin, Aug. 1, 1967, Lloydsville Mine Fire Action Set by Joe Grata.
Letter from West Penn Power Company July 23, 1969

*Primary Examiner*—M. Henson Wood, Jr.
*Assistant Examiner*—Gene A. Church
*Attorneys*—Robert S. Dunham, P. E. Henninger, Lester W. Clark, Gerald W. Griffin, Thomas F. Moran, Howard J. Churchill, R. Bradlee Boal and Christopher C. Dunham ABSTRACT: A marked suppression and inhibition of highly exothermic chemical reactions is indicated when finely divided particulate matter of special physical structure is present in small or even trace amounts. The particulate matter has a composition or makeup which optimizes the combination of properties of density, heat capacity, heats of fusion and vaporization, thermal conductivity, exothermic heat of formation and particle size. Specifically, the particulate matter is structurally skeletonized for porosity and its surface is distinguished by a high incidence of peaks, edges, pores and cavities, such as cavities in the size range $3-4 \times 10^{-4}$ M$\mu$, multiple connected surfaces and preferably a measurable incidence of lattice defects such as in the form of missing atoms at or near the surface. Numerous materials, organic and/or inorganic, may comprise the particulate matter of this invention, e.g. boron, boric acid, boron carbide, lithium oxide, lithium hydroxide, lithium carbide, lithium nitride, lithium fluoride and particularly the inorganic compounds of such elements as magnesium, aluminum, potassium, calcium, titanium, vanadium, chromium, manganese, nickel and zinc and related organometallic compounds. Also particularly useful are organic compounds, such as the polymeric organic compounds and agglomerates thereof, especially those exhibiting a highly skeletal or reticular structure. These materials may be employed to suppress or inhibit a highly exothermic chemical reaction, such as a flame or an explosion within a closed space or substantially closed space by dispersing and/or suspending therein these materials in the form of a dust, cloud or smoke.

PATENTED DEC 8 1970
3,545,547
SHEET 2 OF 2
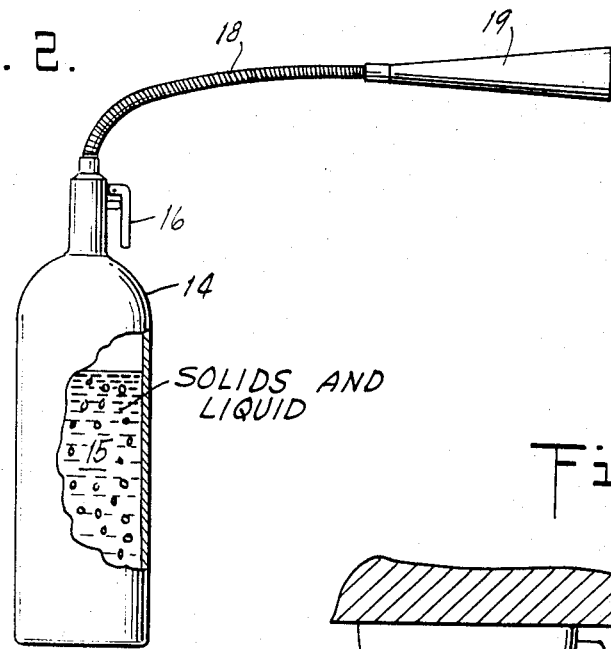
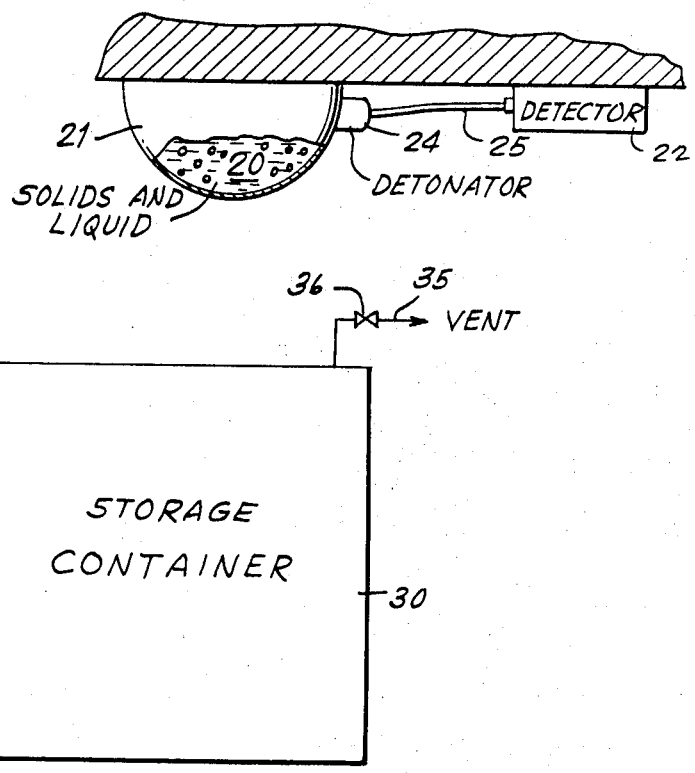
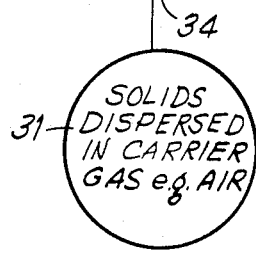
INVENTORS
JOSEPH IRGON
BY HOWARD W. COLE, JR.
Thomas F. Moran
ATTORNEY 3,545,547

FIRE AND/OR EXPLOSION SUPPRESSION

This invention relates to materials and a method employing such materials for the suppression and/or inhibition of highly exothermic chemical reactions, such as flame, explosion and the like. The materials and method of this invention are particularly useful for suppressing and/or inhibiting flames and/or explosions within an environment, such as a closed environment, e.g. tank or storage area or working area, wherein combustible or flammable mixtures of air, including oxygen, and a combustible or flammable material, such as flour, finely divided sugar, coal, dust, flammable organic vapors, etc. occur.

It is known to suppress and/or quench explosions and fires in coal mines by discharging or introducing thereinto relatively large amounts of rock dust. It is also known to quench or to suppress fires by discharging or introducing into the flames relatively large amounts of inert solid particulate matter, such as sodium bicarbonate. Various techniques and solid materials are known and have been proposed for extinguishing fires, see particularly U.S. Pat. Nos. 2,450,569 (1948), 2,693,240 (1954), 2,869,647 (1958), 2,969,116 (1961), 3,055,435 (1962), the disclosures of which are incorporated herein and made part of this disclosure. For the most part these materials and techniques are based on the employment of solid materials as a heat sink and/or diluent to cool and/or dilute the reactants, such as by employing the added solid materials in a sufficiently large amount to reduce the temperature of the reactants to a temperature below ignition temperature or explosion temperature under the given conditions and/or to dilute the reactants to beyond the flammability region. These materials, however, have not generally been employed under conditions such that flame or explosion is substantially continuously inhibited and suppressed.

It is an object of this invention to provide materials, and methods of employing the same, useful for continuously suppressing and inhibiting highly exothermic chemical reactions such as flames and explosions.

It is another object of this invention to provide materials, and methods of employing said materials, useful for inhibiting or preventing and suppressing explosions and/or flames within an environment, particularly a closed environment such as a storage tank or container or working space.

How these and other objects of this invention are achieved will become apparent in the light of the accompanying disclosure and drawings wherein:

FIG. 1 illustrates, highly schematically, a portion of the surface of a particle of solid material and its properties useful in the practice of this invention for the inhibition and suppression of highly exothermic chemical reactions;

FIG. 2 schematically illustrates a quick opening fire extinguisher provided with the special solid materials in accordance with this invention;

FIG. 3 schematically illustrates an installation of a fire and/or explosion suppression device containing the finely divided materials in accordance with this invention;

FIG. 4 schematically illustrates an installation in accordance with this invention for suppressing and/or inhibiting fire and/or explosion within a closed space, such as a storage shed or container used for the storage of flammable solids and/or liquids.

It has been discovered that a marked suppression and inhibition of highly exothermic chemical reactions are obtainable when finely divided particulate matter of special physical structure is present in small or even trace amounts. The particulate matter has a composition or makeup which optimizes the combination of properties of density, heat capacity, heats of fusion and vaporization, thermal conductivity and particle size. Specifically, the particulate matter is skeletal or reticular in structure and desirably is porous. Its surface is distinguished by a high incidence of peaks, edges, pores and cavities or depressions, such as cavities or depressions in the size range of about $3-4 \times 10^{-4}$ $\mu$, and preferably possesses multiple connected surfaces and a measurable incidence of lattice defects, such as lattice defects in the form of missing atoms at or near the surface.

The particulate matter is also characterized by an exceptional absorptivity and persorptivity, both of the physical and of the chemisorption type, a high surface free energy and small activation energy for absorption, a large electrical capacitance per unit mass and potential surface charge, a semipermeable surface in the sense that the smaller and more active chemical species in a gas phase will penetrate and saturate the lattice holes and smaller surface pores or cavities and an exceptional residence time for chemisorbed atoms and molecules, such that their specific rates of desorption are small relative to the specific rates of absorption of active species, as well as a comparatively large thermal accommodation factor measuring the fractional extent to which both normal molecular and activated molecular species upon reaching the surface are reflected or desorbed as normal molecules in thermal equilibrium with the surface.

The above indicated combination of chemical and physical properties endows the special particle form material with a number of special characteristics such as:

1. Aerosol suspensions of the particulate matter are stable to settling and agglomeration.
2. The surfaces of the particulate matter are stable to thermal shock and high heat flux.
3. High surface free energy due to the skeletal structure of the particles characterized by a high concentration of peaks, edges, pores and lattice defects on the multiple connected surfaces.

These combinations of special properties possessed by the particular matter modify basic gas phase chemical reactions or combustion mechanisms in ways that slow or stretch the reaction or combustion rate to a point where the reaction or combustion does not propagate, i.e. it restores a metastable or induction state which normally precedes active combustion.

The mechanism of reaction or combustion suppression of the particulate matter of this invention is analogous in certain respects to a reverse laser effect in the sense that the suppressant particles deactivate in quantumlike increments the high energy species, e.g. the free radicals and activated molecules, which are responsible for propagating the combustion and disperse and diffuse the high energies of these species among the less active constituents that do not propagate reaction chains. This is accomplished through the process of chemisorption and resonant heat interchange among active and less active surface sites and, finally, desorption of deactivated and inactive molecules. The deactivation process is schematically illustrated in FIG. 1.

In FIG. 1 the activity of the surfaces of the particle 10 is represented by contour lines 11 and there is illustrated the balance at steady-state conditions between the quantum streaming of active species to the surface and the continuous stream of desorbed thermal molecules. The desorbed stream is at a temperature $T_1$ in equilibrium with the average surface temperature $T_2$. The temperature $T_3$ corresponds to the temperature the deactivated molecules would have had they retained the heat of chemisorption without disassociation or reactivation, i.e. the stagnation temperature.

From a physical standpoint the desired surface fabric will retain activated absorbate under conditions of instability relative to a flat surface. The residence time would be sufficient for an intersite energy exchange followed by desorption of inert molecules. The particle of the special suppressant materials of this invention serves as a heat sink only in the sense that it accepts energy from a high energy source represented by chain propagating species of a given concentration. It does not retain but degrades this energy by discharge to a lower energy level represented by the stream of desorbed thermal molecules which are accommodated to an average surface temperature. The thermodynamic situation is comparable to a unique heat engine without work (the special particulate matter or suppressant) operating between two specific energy levels in compliance with the first and second laws of thermodynamics.

Surface reactions occur with a minimum of thermal impedance in two ways:

1. as a chemisorption process on surfaces of a typically high curvature relative to the particle size; and
2. as persorption or occlusion of submicron size pores and subsurface cavities which are saturated with high energy species but are not accessible to thermal molecules due to the latter's larger sizes and smaller momenta.

A common characteristic of either kind of chemisorption is a heat of reaction which is much greater than that associated with normal chemical reactions. For example, if the surface were composed of carbon atoms in their characteristic structural arrangements it would be found that the initial heat of reaction of the surface, by way of example, with oxygen gas, would be closer in magnitude to the combustion of gaseous carbon instead of solid carbon. This surprising phenomenon relating to the character of a high partial molar heat of surface formation, in effect occurs even on flat surfaces to an infinitesimal degree during the initial stages of absorption. In the instance of the subject invention, however, it is persistent to an extent explainable in terms of the thermodynamic, kinetic and structural considerations.

The surface to mass ratio of the special particles in accordance with this invention is usually in the range 1000 to 3000 $m^2/gm$. On the basis of the smaller value 1 pound of the special particular matter per 10,000 cubic feet of reaction volume yields a particle surface to reaction volume ratio of about 16 $cm^2$ per $cm^3$. In most reactions of practical importance, and for larger fires in particular, the normal boundary surfaces would contribute negligibly to the total surface exposed to the reaction. A comparable ratio of surface to volume in the absence of the particulate would be afforded by a long reaction tube with a diameter of 0.25 cm. or the free volume within a rigid foamed plastic having a density of about 4 pounds per cubic foot. Accordingly, if it were simplistically assumed that the same limitations on combustion applied to all situations on the basis of a common surface to volume factor, any inert solid material when sufficiently subdivided would tend to make a satisfactory suppressant.

The special finely divided particulate matter of this invention is able to store large amounts of heat by virtue of its favorable thermal properties. There is another aspect to the utilization of the particulate matter as a heat sink than the quenching of a combustion reaction. Although the thermal conductivity of most of the materials capable of making up the special finely divided particulate matter of this invention is small the important consideration is the ability of the special particulate matter of this invention to distribute among a maximum number of structural modes or degrees of freedom the excess energy released in the chemisorption processes. Under these circumstances local transient energy storage processes can exceed by far the average heat storage capacity of the material.

The chemisorption reactions of the special particulate matter of this invention constitute primarily the negative catalysis of the chain termination steps and not the positive catalysis involved in the heterogeneous combustion reactions because of the chemical structure of the surface and its unusual topography, i.e. sharp peaks, edges, semipermeable pores, lattice defects and multiple connected surfaces in depth. This situation is consistent with a low deactivation energy and a large value representing the ratio of deactivating collisions to the total number of chain reaction propagating collisions with surfaces. The principal mechanism for suppression involves the chemisorption or molecular sieving of the chain propagating species at the particle surfaces and sufficient residence time for deactivation and release of the absorbed species into the gas phase together with other desorbate as a normal (Maxwellian) distribution of molecules.

Numerous materials, organic and inorganic and mixtures thereof, may comprise the particulate matter of this invention, e.g. boron, boric acid, boron carbide, lithium oxide, lithium hydroxide, lithium carbide, lithium nitride, lithium fluoride, and particularly inorganic compounds of such elements as magnesium, aluminum, potassium, calcium, titanium, zirconium, vanadium, chromium, manganese, nickel and zinc. In addition to inorganic materials, organic materials or compounds, particularly polymeric organic materials and organo-metallic compounds, and mixtures thereof, are useful in the practice of this invention. For example, organic materials which are useful in the practice of this invention include such polymeric materials as polystyrene, the polyolefins and the numerous other organic polymeric materials. The organic polymeric materials useful in the practice of this invention are characterized by possessing a skeletal or reticular structure as previously described herein and evidence a high surface area per unit weight. The selection of the materials to be employed, i.e. organic or inorganic materials or mixtures thereof, depends in most instances on the environment to be protected. Organic polymeric materials, and other materials capable of being given an electric charge, e.g. by spraying electrons thereon, prior to or during use in accordance with this invention would appear to be especially useful since particles of such materials when carrying the same type of electric charge would resist agglomeration and would tend to produce more stable and longer lasting suspensions.

Materials useful in the practice of this invention may possess a wide range of particle size from a fairly large particle size in the order of an average diameter of a fraction of an inch, such as about one-fourth of an inch or about 1 centimeter, down to submicron size of about 0.2 micron, such as a particle size in the smoke range. Useful results in the practice of this invention are obtainable with finely divided particles having a particle size in the range from about 1 millimeter down to about a fraction thereof, such as about a micron, e.g. particles having a size in the range 5—500 microns, more or less.

The special materials in accordance with this invention may be employed to suppress or inhibit flame and/or explosion with the aid of conventional aerosol propellant techniques when the materials are employed in the form of stored powders. The suppressant materials may also be generated in situ from suitable raw materials and then supplied by means of a carrier fluid, such as a gas, into the environment to be protected.

In the case of the situation where the suppressant materials are generated in situ just prior to utilization, storage stability with respect to the finely divided particulate suppressant materials is not a problem. When, however, the finely divided suppressant materials are stored in a container for discharge or use as may be required agglomeration of the stored materials can be reduced and/or prevented by storing the materials in a suitable container with a carrier fluid, such as a compressed gas or a liquid, having a density approaching that of the particulate material. The dielectric properties of the carrier fluid employed during storage can also be adjusted to minimize agglomeration of the finely divided particulate material. In use for inhibiting and/or suppressing highly exothermic chemical reactions, such as a flame or explosion, the suppressant materials are employed at an effective concentration in the environment to be protected. For example, the special materials of this invention are effective as a smoke or dispersion at a concentration in the range from about 0.002 to about 1.0 pound of material per 10,000 cubic feet of space. The special particulate materials of this invention are capable of readily forming a stable suspension in a gas, such as air, since frequently the surface charge on the particles is in the order of several hundred statcoulombs per $cm^2$.

Various well known methods may be employed in the preparation of the finely divided particulate material having the special surface characteristics described herein. These techniques include heat treatment and/or chemical treatment, such as acid treatment, as well as comminution. These techniques are particularly applicable to the treatment of activated gels and hydrated metal oxides or metal hydroxides. Where appropriate, the finely divided solid materials in accordance with this invention may be generated in situ by suitable chemical reaction.

As indicated herein the practice of this invention to inhibit and/or to suppress strongly exothermic chemical reactions may be carried out by way of a number of techniques. For example, the suppressant materials in accordance with this invention may be immediately discharged into a space or into a space or environment to be protected upon the initial formation and/or detection of a flame or explosion therein. The suppressant materials in accordance with this invention may also be maintained at an effective concentration substantially constantly within the environment or space to be protected such that flame or explosion within such a space or environment is substantially continuously inhibited and/or suppressed and the likelihood of initiation of a flame or explosion very unlikely.

Referring now to the drawings, FIG. 2 illustrates a fire extinguisher provided with the suppressant material in accordance with this invention wherein the extinguisher is made up of a pressure vessel or container 14 provided with an admixture 15 of the suppressant material in accordance with this invention dispersed and/or suspended in a liquefied, normally gaseous material, such as liquid $CO_2$. In use valve handle 16 would be depressed or squeezed to permit the contents of container 14 to flow under its pressure via conduit 18 to nozzle 19 for discharge onto the flame site.

FIG. 3 represents an installation in accordance with this invention wherein an admixture 20 of the suppressant material in accordance with this invention together with an inert liquefied normally gaseous material or an inert readily vaporizable liquid, such as a low molecular weight halogenated hydrocarbon, is provided within frangible container 21. Detector 22 serves to monitor the space to be protected and is actuated upon detection of a flame or the initiation of an explosion therein to send a signal to detonator 24 via signal carrier 25 to explode detonator 24 to break open container 21 and to disperse the admixture therein into the surrounding space for suppression of the detected flame and/or explosion. Suitable installations of this type are known, see for example, U.S. Pat. Nos. 2,693,240 and 2,869,647.

FIG. 4 shows yet another embodiment of the practice of this invention wherein the suppressant material in accordance with this invention are maintained suspended within a substantially closed environment for the inhibition and/or suppression of any flame or explosion therein. As illustrated in FIG. 4 storage container 30 which may be a gasoline tank or other container or working space for holding or processing flammable materials, such as gasoline or finely divided flammable solid materials, such as sugar or flour, or a coal mine, is supplied intermittently or continuously, if desired, with a suspension of the suppressant materials in a suitable carrier gas, such as air, from a suitable source 31 via line 32. Line 32 is shown provided with valve 34 for regulation and control of the flow of the suspended suppressant materials into container 30. Container 30 may be provided with vent line 35 which is also provided with valve 36 for the control and regulation of gas vented from container 30. By maintaining a suitable concentration of the suppressant materials within container 30 any flame or explosion is inhibited and/or suppressed therein. This inhibition and/or suppression of an explosion or flame within container 30 can be maintained substantially continuously, as desired, by maintaining an effective amount of dispersed suppressant material therein.

Although emphasis in the disclosure of this invention has been placed on its usefulness to inhibit and/or suppress highly exothermic reactions, the practice of this invention is also useful for controlling chemical reactions broadly, particularly controlling chemical reactions by controlling and/or suppressing undesirable side reactions or by controlling the rate of the main, desired chemical reactions.

As will be apparent to those skilled in the art in the light of the foregoing disclosure, many modifications, alterations and substitutions are possible in the practice of this invention without departing from the spirit or scope thereof.

We claim:

1. A method which comprises maintaining suspended within an environment finely divided particulate matter, said particulate matter being characterized by a skeletal structure evidencing a high incidence of peaks, edges, pores and cavities and with local curvatures in the range $(0.2\text{-}1 \times 10^7 \text{ cm})^{-1}$ and with a lower limit of total surface to mass ratio of about 1000 $m^{2/gm.}$, the aforesaid finely divided particulate matter being maintained suspended within said environment so as to suppress and/or inhibit highly exothermic chemical reactions therein, such as flame, explosion and the like.

2. A method in accordance with claim 1 wherein said particulate matter comprises inorganic or mineral particulate matter.

3. A method in accordance with claim 1 wherein said particulate matter is dispersed and/or suspended within said environment in an effective amount up to about 1.0 pound per 10,000 cubic feet of said environment.

4. A method in accordance with claim 1 wherein the amount of said particulate matter dispersed or suspended within said environment is sufficient to yield a surface to volume ratio of at least 16 $cm^2/cm^3$, said surface being derived from said particulate matter and said volume being based on said environment.

5. A method in accordance with claim 1 wherein said particulate matter is selected from the group consisting of boron, inorganic boron compounds, inorganic lithium compounds, silicon, inorganic silicon compounds, inorganic magnesium-containing compounds, inorganic aluminum-containing compounds, inorganic potassium-containing compounds, inorganic calcium-containing compounds, inorganic titanium-containing compounds, inorganic vanadium-containing compounds, inorganic zirconium-containing compounds, inorganic chromium-containing compounds, inorganic manganese-containing compounds, inorganic nickel-containing compounds, inorganic zinc-containing compounds and inorganic iron-containing compounds.

6. A method in accordance with claim 1 wherein said environment is a closed environment.

7. A method in accordance with claim 1 wherein said environment is a coal mine.

8. A method in accordance with claim 1 wherein said environment is a container partially filled with a volatilizable flammable organic liquid.

9. A method in accordance with claim 1 wherein said environment is a container partially filled with a flammable and/or combustible finely divided solid.

10. A method in accordance with claim 1 wherein said particulate matter comprises an organic compound.

11. A method in accordance with claim 1 wherein said particulate matter is a polymeric organic compound.